INVENTOR
ROBERT L. CRAMER

United States Patent Office 3,169,466
Patented Feb. 16, 1965

3,169,466
PRESSURIZATION SYSTEM FOR A
SEALABLE ENCLOSURE
Robert L. Cramer, Davenport, Iowa, assignor to The Bendix Corporation, Davenport, Iowa, a corporation of Delaware
Filed Mar. 9, 1962, Ser. No. 178,611
4 Claims. (Cl. 98—1.5)

This invention relates to a pressurization system for controlling the fluid pressure in a confined space and more particularly to a pressurized system for use with an ejectable capsule of an air vehicle whereby a single means controls a substantially constant pressure and an absolute pressure maintained at a pressure never less than a physiologically required minimum pressure.

For the purposes of clearly illustrating the present invention and the state of the art, the pressurization system will be illustrated for use with a capsule designed for one aviator of an aircraft. The invention should not be considered to be limited thereto in that the invention pressurization system has wide application including use in a space vehicle or a multi-passenger capsule of an aircraft. It has been found that to bring a pilot down safely from a high performance aircraft at high altitudes and speeds it is necessary to eject the pilot in an air tight capsule. In such a capsule two necessary functions must be performed, one, it is required to maintain the capsule at a pressure above the physiologically required minimum pressure and, two, to maintain the capsule tightly closed, thereby preventing a rapid loss of such pressure.

An object of the present invention is to provide a pressurization system for controlling the fluid pressure in a confined space.

Another object of the present invention is to provide a pressurization system for maintaining two pressures of an air vehicle capsule, the valve of one of said pressures never less than the physiologically required minimum pressure.

Several systems have been developed for use with capsules of an aircraft. These systems include a multi-valve arrangement for controlling the capsule pressure and door seals. The present systems include a pneumatic-mechanical arrangement to perform some of the functions required in an ejectable capsule. One of the present systems is clearly illustrated in the patent to E. H. Replogle, Patent Number 3,006,585, issued October 31, 1961. The supply of gas for a capsule pressurization is necessarily a high pressure gas. This high pressure requirement has resulted in systems which are bulky and are a multi-valve system.

A further object of the present invention is to provide a pressurization system which comprises a single compact, lightweight valve construction.

A still further object of the present invention is to provide a pressurization system which is purely a pneumatic system.

A still further object of the present invention is to provide a pressurization system for an air vehicle capsule which employs the principle of gas loading.

A still further object of the present invention is to provide a pressurization system which conserves all the gasses used in the system for valve operation and uses said gases for capsule pressurization.

Certain of these objects are realized in the invention by the provision of means for releasing a gas supply, means for maintaining a substantially constant pressure and an absolute pressure including means for controlling said gas supply at a pressure not less than a physiological critical pressure and a second means for controlling said gas supply at a pressure substantially equal to a constant pressure.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawing is for the purposes of illustration and description and is not to be construed as defining the limits of the invention.

Figure 1:
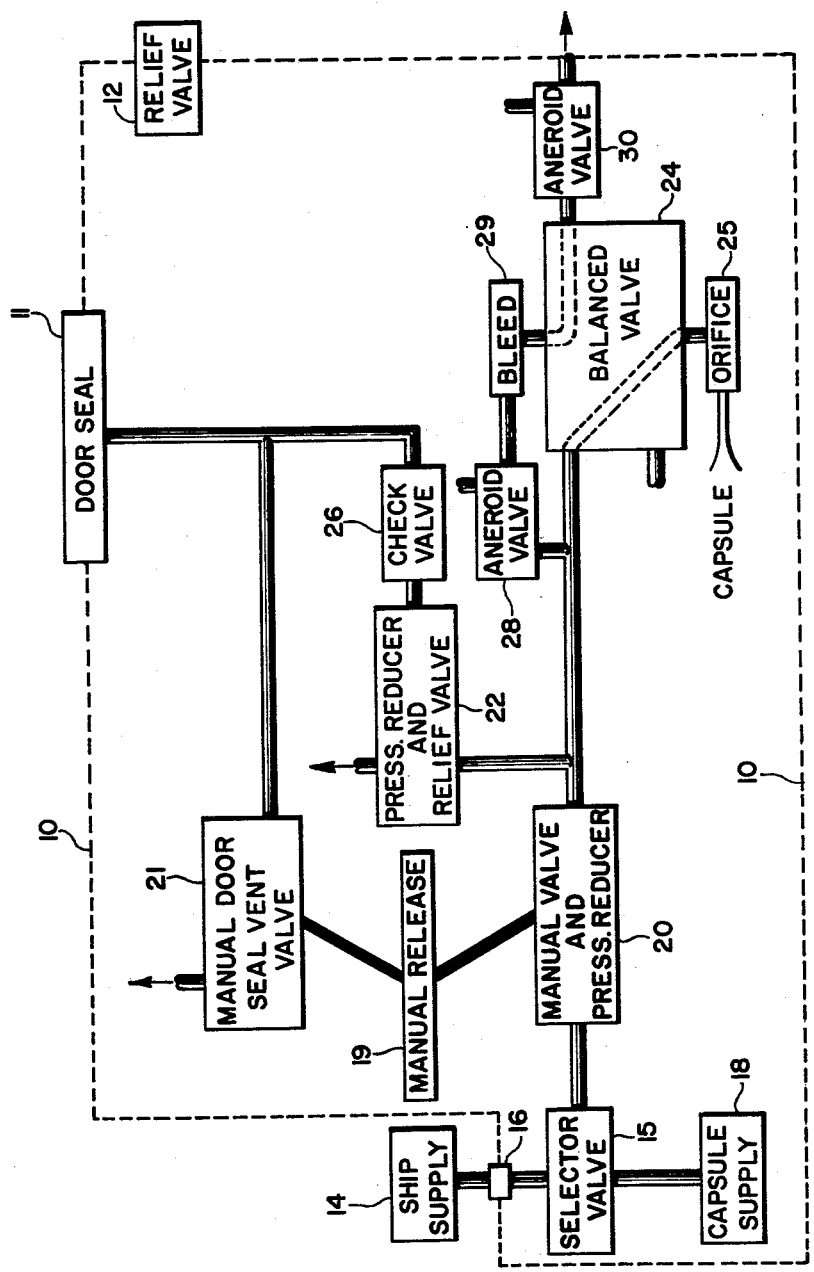
FIG. 1 is a diagrammatic layout of the complete invention.

Referring now to the drawings and specifically to FIG. 1, there is shown a capsule pressurization system having a capsule shell designated by the numeral 10 and illustrated by the dotted line of the drawing. The capsule 10 includes a door (not shown) and a pneumatic door seal designated by the numeral 11. Disposed in the wall of capsule 10 is relief valve 12 which is more accurately described as a negative absolute pressure controller. Valves of this type are well known in the art and are disposed to admit or exhaust air from the capsule 10. The function of valve 12 is to maintain the pressure within the capsule 10 above a predetermined constant absolute pressure and to maintain capsule pressure equal to ambient pressures at all pressures above the predetermined constant absolute pressure.

The physiological demands of the human body require that a person have a certain external pressure acting on his body at all times. Thus an aviator flying at high altitude must have pressure protection for his body when he is subjected to critical atmospheric pressure. The critical pressure under which value severe damage is done to the body, is generally considered to be 2.7 p.s.i.a. (pounds per square inch absolute), this pressure is equivalent to approximately 40,000 feet altitude. It is more desirable to maintain higher pressure where artificial pressurization is required. A pressure of 5 p.s.i.a. or equivalent altitude of 27,000 is considered a practical pressure to maintain and a desirable pressure in view of physiological demands when an inlet gas mixture of 60% oxygen and 40% nitrogen is used. In the invention where illustrations are to be used, 5 p.s.i.a. will be set forth as the physiological required pressure but the invention is not to be considered to be limited thereto.

In the invention a loss of cabin pressure at high altitudes within which cabin the capsule 10 is disposed will cause the capsule door to close and thus require capsule pressurization. Gas will be supplied from ship supply 14 while the capsule is in the aircraft and will pass to selector valve 15. When ejection of the capsule 10 from the aircraft occurs, disconnect 16 will sever the ship supply 14 connection and the gas for the capsule will be supplied from capsule supply 18 and pass to selector valve 15.

Upon cabin decompression or ejection the pilot operates manual release 19 thereby allowing gas from the selector valve 15 to pass the manual valve and pressure reducer 20. Release 19 also closed door seal vent valve 21 thereby cutting off the fluid communication between the door seal 11 and the interior of the capsule 10. It is also envisioned within the purview of the invention that manual release 10 may be an aneroid operated release whereby the identical functions described above are performed by an aneroid valve operated when a predetermined pressure is reached with the capsule 10. Release 19 may also be mechanically connected to the capsule door and be actuated when the capsule door is closed.

Manual valve and pressure reducer 20 is in fluid communication with pressure reducer and relief valve 22 and balance valve 24. Balance valve 24 controls the flow of gas to orifice 25 and into the capsule 10. Gas flowing through pressure reducer and relief valve 22 passes through check valve 26 to the door seal 11. Manual valve and pressure reducer 20 is in communication with aneroid valve 28 which admits gas to balance valve 24 through bleed orifice 29 for gas loading the valve 24. The gas employed for gas loading balanced valve 24 is maintained by means of aneroid valve 30 wherein the gas flow out of balanced valve 24 is controlled.

The operation of the pressurization system will be described while setting forth the details of the invention illustrated in FIG. 2 of the drawings. The pressures used in the following description are for the purposes of more clearly illustrating the invention and should not be considered to limit the inventon to pressure values used.

Gas at a nominal pressure of 3000 p.s.i.g. (pounds per square inch gage) enters at gas inlet 31 from selector valve 15 (FIG. 1) and passes through filter 32 to high pressure valve 34 of manual valve and pressure reducer 20. Spring 35 biases valve 34 toward a closed position.

Figure 2:
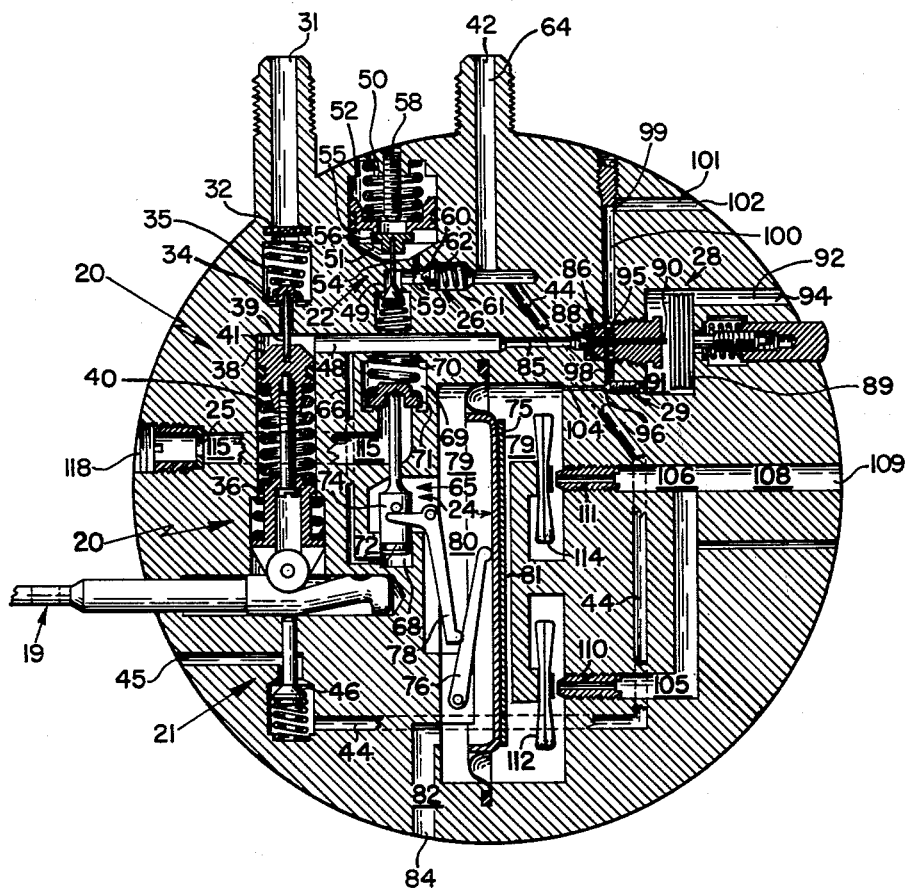
FIG. 2 is a schematic drawing of a pressurization controller embodying the invention.

The portion of the pressurization system drawn in FIG. 2 is schematically shown in an inactivated position. Upon cabin decompression or ejection of the capsule 10, manual release 19 is pulled out. The body 36 of the valve 20 is moved in an upward position causing valve head 38 to come in contact with stem 39 of high pressure valve 34 and to open the valve 34. Pressure reducer spring 40 thereby loads valve 34 and is preset to maintain a nominal 200 p.s.i.g. gas pressure in chamber 41.

Prior to activation of manual release 19, door seal 11 is in fluid communication with the interior of the capsule 10 by means of door seal outlet 42, passageway 44, and outlet 45 which is open to the capsule 10. Movement of release 19 permits valve head 46 of manual door vent valve 21 to seal thereby closing off passageway 44 and the communication of the door seal 11 to the capsule 10.

Pressurization of the door seal 11 is accomplished by means of the pressure reducer and relief valve 22 and check valve 26. Gas at 200 p.s.i.g. passes from chamber 41 through passageway 43 to valve head 49 of the valve 22. The force of spring 50 holds valve head 49 normally open. The application of 200 p.s.i.g. pressure to the pressure reducer and relief valve 22 causes the valve head 49 to throttle or close when the reduced pressure in chamber 51 reaches 20 p.s.i.g. When the gas pressure in chamber 51 drops below 20 p.s.i.g. the force of spring 50 moves piston head 52 in a downward direction thereby opening valve head 49 which is connected to piston 52 by means of stem 54. A relief valve is incorporated in the valve 22 to limit the pressure in chamber 51 to 35 p.s.i.g. in the case of valve malfunction. An increase in pressure in chamber 51 above 35 p.s.i.g. will move piston head 52 in an upwards direction against the force of spring 50 and separate sections 55 and 56 of piston head 52 allowing the gas in chamber 51 to pass to relief outlet 58 which vents into the interior of the capsule 10. Thus over-pressurization of the door seals 11 is prevented and any relief valve leakage is vented to the capsule 10 to prevent gas wastage. Check valve 26 receives gas at 20 p.s.i.g. flowing past valve head 48 through passageway 59 to check valve head 60 which is biased toward a closed position by means of light spring 61. Check valve 26 maintains a constant gage pressure of 20 p.s.i.g. in chamber 62 which is in communication with door seal 11 by means of passageway 64 and door seal outlet 42.

Pressurization of the capsule (refer to FIG. 1) is accomplished by the balanced valve 24 controlling the flow of gas from manual valve and pressure reducer 20. Gas for actuating the balanced valve 24 is taken from the supply circuit and regulated by aneroid valve 28, bleed 29, and aneroid valve 30.

Supply gas is at a reduced pressure of 200 p.s.i.g. in chamber 41 (refer to FIG. 2) as heretofore described. Gas from chamber 41 passes to both sides of controller valve 65 of balanced valve 24, to the balanced side from chamber 41 through passageways 48 and 66 to the ballance chamber 68 and to the supply side from chamber 41 through passageway 48 to supply chamber 69. In the unactuated position as shown, spring 70 disposed in chamber 69 holds supply valve head 71 in the closed position. Supply valve head 71 is connected to the piston 72 disposed in balance chamber 68 by means of connecting bar 74. The 200 p.s.i.g. gas pressure in chambers 68 and 69 acting on valve head 71 and piston 72 maintain the controller valve 65 in the balanced position. The controller valve 65 is actuated by the movement of resilient diaphragm 75 which is joined to connected bar 74 of the valve 65 by means of pivoted links 76 and 78. Diaphragm 75 divides the interior of chamber 79 into a capsule chamber 80 and an actuating chamber 81. Capsule chamber 80 is in fluid communication with the interior of the capsule 10 by means of passageway 82 and sensing port 84 which opens to the capsule 10.

Actuating gas pressure for the actuating chamber 81 of balance valve 24 is supplied as follows. Gas at 200 p.s.i.g. in chamber 41 flows through passageways 48 and 85 to fixed orifice shut-off valve 86 of aneroid valve 28, valve 86 is held normally closed by the gas pressure acting on the valve head 88. The valve head 88 is opened by means of aneroid 89 acting on valve stem 90 at capsule pressures below 12 p.s.i.a. Aneroid 89 is disposed in chamber 91 which is in communication with the capsule by means of passageway 92 and sensing port 94. Gas flowing past valve 88 passes through passageway 95 to fixed orifice 96 of bleed 29 by means of passageway 98 and to fixed orifice 99 through passageways 100. Gas flowing past fixed orifice 99 is ported to the interior of the capsule 10 by means of passageway 101 and outlet port 102. Fixed orifice 96 permits 1 l.p.m. (liter per minute) to flow to passageway 104 and into actuating chamber 81. A large volume of gas to chamber 81 permits a fast response to the diaphragm 75 to pressure changes thus allowing a high force at the controller valve 65 and a large movement of the diaphragm 75.

Actuating chamber 81 is in communication with the capsule 10 by means of passageways 105 and 106 joined to passageway 108 which opens to the capsule through sensing port 109. Aneroid valve seats 110 and 111 are disposed in passageways 105 and 106, respectively, and extend into the actuating chamber 81. Aneroids 112 and 114 are mounted in the actuating chamber 81 and disposed for movement toward valve seats 110 and 111 respectively upon a decrease in pressure in chamber 81 and to close at a predetermined minimum critical pressure. The two aneroids 112 and 114 are not both necessary in practicing the invention but provide a fail-safe pressurization if one aneroid fails, develops an air leak and expands. The port from passageway 104 into actuating chamber 81 is removed from the opening of valve seats 110 and 111 into chamber 81 to eliminate the effect of gas velocity or back pressure on the sensing of capsule pressure in chamber 80.

After ejection of the capsule 10 from the air vehicle or in the case of cabin decompression the negative absolute pressure controller 12 will maintain capsule pressure equal to the ambient pressure at all pressures above 5 p.s.i.a., or in terms of altitude, maintain a pressure in the capsule 10 equivalent to the capsule altitude for all altitudes below 27,000 feet. Above 27,000 feet altitude pressure controller 12 will remain closed or vent capsule pressure to the ambient air if capsule pressure exceeds 5 p.s.i.a.

When capsule altitude is below 27,000 feet, aneroids 112 and 114 are not expanded and gas from bleed 29 passes unrestricted through chamber 81, seats 110 and 111, passageways 105, 106, and 108 to port 109 and into the capsule 10. Under these conditions, balance valve 24 is not actuated and the gas flow to the capsule is limited to the amount of gas flowing through fixed orifice shut-off valve 86, 1 l.p.m. through bleed 29 and to the capsule through port 109 and 30 l.p.m. through fixed orifice 99 and to the capsule through port 102.

When capsule altitude is above 27,000 feet, pressure equivalent to 5 p.s.i.a., aneroid 112 and 114 are expanded to throttle the gas from bleed 29 through valve head 110 and 111 and to maintain this altitude pressure in chamber 81. The differential pressure across diaphragm 75 created by capsule pressure in chamber 80 and the above pressure in chamber 81 applies a force on levers 76 and 78 to open controller valve 65 by moving valve head 71 from its seat and to thereby pressurize the capsule by the flow of gas from chamber 41 through chamber 69, passageway 115, orifice 25 and capsule supply port 118 to the capsule. When the capsule pressure is raised to 5 p.s.i.a., pressure equivalent to 27,000 feet, the pressure is sensed in chamber 80 through passageway 82 and sensing port 84. The differential across the diaphragm becomes zero and controller valve 65 closes.

The size of orifice 25 will limit the maximum rate of pressurization within a particular time limit. Flow limiting orifice 25 will limit the flow to the capsule without causing back pressure build-up in chamber 80 under the diaphragm 75. The maximum rate of pressurization may also be controlled by limiting the movement of diaphragm 75 by means of limit stops (not shown).

While the pressurization system as shown in the drawing is of the construction shown and disclosed, it is understood that the instant invention is not limited to any particular form or construction. Moreover, other changes and modifications of the novel pressurization system contemplated herein may be made by those skilled in the art without departing from the scope of the instant invention.

I claim:

1. A pressurization system for use with a sealable enclosure having a pressure responsive sealing means whereby the system provides an absolute pressure never less than a physiological critical pressure for said enclosure and a higher second pressure for said sealing means comprising a high pressure gas inlet, a first flow passage in gas communication with said inlet and having an outlet means adapted to be in communication with a sealing means; means for controlling the flow through said first flow passage comprising a first valve member disposed in said first flow passage, pressure responsive means for controlling said first valve member and maintaining said second higher pressure downstream of said first valve member, check valve means disposed in said first flow passage and downstream of said first valve member for preventing a reverse flow from said outlet to said first valve member; a second flow passage in gas communication with said inlet and having a passage outlet means adapted to be connected with a sealable enclosure means for controlling the flow through said second flow passage comprising a second valve member disposed in said second flow passage, a resilient diaphragm connected to said second valve member and means for applying to said resilient diaphragm a pressure proportional to the difference between a pressure inversely variable with altitude but never less than said critical pressure and the current pressure at said passage outlet.

2. A pressurization system for use with a capsule of an air vehicle having a pressure responsive capsule seal whereby said system provides an absolute pressure never less than a physiological critical pressure for said capsule and a higher second pressure for said capsule seal comprising a high pressure capsule gas supply, a pressure reducer supplied by gas from said capsule gas supply and discharging into an outlet chamber, actuatable means for positioning said pressure reducer to respond to said gas from said capsule gas supply, a first flow passage in gas communication with said outlet chamber and adapted to be in communication with a capsule seal; means for controlling the flow through said first flow passage comprising pressure reducer valve means for controlling the flow through said first flow passage and maintaining the fluid pressure in a capsule seal at said second higher pressure, a check valve disposed in said first flow passage and downstream of said pressure reducer valve means, a capsule seal vent passage in gas communication with said capsule seal and said capsule, a seal vent valve disposed in said vent passage and responsive to said actuatable means, a second flow passage in gas communication with said outlet chamber and adapted to be in communication with a capsule; means for controlling the flow through said second flow passage comprising a balanced valve disposed in said second flow passage, a resilient diaphragm connected to said second valve means, flow limiting means in communication with said second flow passage for controlling the gas flow to one side of said resilient diaphragm aneroid means for maintaining the gas pressure on said one side of said resilient diaphragm at a pressure inversely variable with altitude but never less than said critical pressure and passage means for maintaining capsule pressure on the second side of said resilient diaphragm.

3. A pressurization system for use with a capsule of an air vehicle having a pressure responsive capsule seal whereby said system provides an absolute pressure never less than a physiological critical pressure for said capsule and a higher second pressure for said capsule seal comprising a high pressure capsule gas supply, a pressure reducer supplied by gas from said capsule gas supply and discharging into an outlet chamber, actuatable means for positioning said pressure reducer to respond to said gas from said capsule gas supply, a first flow passage in gas communication with said outlet chamber and adapted to be in communication with a capsule seal; means for controlling the flow through said first flow passage comprising pressure reducer valve means for controlling the flow through said first flow passage and maintaining the fluid pressure in a capsule seal at said second higher pressure, a check valve disposed in said first flow passage and downstream of said pressure reducer valve means, a capsule seal vent passage in gas communication with said capsule seal and said capsule, a seal vent valve disposed in said vent passage and responsive to said actuatable means, a second flow passage in gas communication with said outlet chamber and adapted to be in communication with a capsule; balanced valve means for controlling the flow through said second passage comprising a spring closed valve disposed in said flow passage, a pressure opening chamber communicating with said second passage, valve means disposed in said chamber for opposing the pressure applied to the upstream side of said spring closed valve, an actuating arm connecting said spring closed valve and said valve means, resilient diaphragm means for actuating said balance valve comprising an actuating chamber and a capsule chamber, said diaphragm forming a common wall of said chambers, a flow passage communicating with said second flow passage and said actuating chamber, a flow limiting aneroid valve disposed in said flow passage responsive to the gas pressure in said capsule, a restriction disposed in said flow passage intermediate said aneroid valve and said actuating chamber, aneroid valve means disposed in said actuating chamber for limiting the gas flow from said chamber and maintaining said chamber pressure proportional to a pressure inversely variable with altitude but never less than said critical pressure and a passage in communication with said capsule and said capsule chamber.

4. The invention defined in claim 3 including a flow limiting means disposed in said second flow passage for maintaining a maximum rate of pressurization of said capsule.

References Cited in the file of this patent
UNITED STATES PATENTS

| 2,377,794 | Lobelle | June 5, 1945 |
| 2,701,899 | Krupp | Feb. 15, 1955 |
| 2,873,661 | Fischer | Feb. 17, 1959 |
| 2,986,990 | Fischer | June 6, 1961 |